(12) United States Patent
Thurbide

(10) Patent No.: US 8,293,111 B2
(45) Date of Patent: Oct. 23, 2012

(54) APPARATUS, SYSTEM, AND METHOD FOR CHROMATOGRAPHY USING A WATER STATIONARY PHASE

(75) Inventor: Kevin B. Thurbide, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 0 days.

(21) Appl. No.: 13/108,599

(22) Filed: May 16, 2011

(65) Prior Publication Data

US 2011/0278228 A1 Nov. 17, 2011

Related U.S. Application Data

(60) Provisional application No. 61/345,415, filed on May 17, 2010.

(51) Int. Cl.
*B01D 15/08* (2006.01)

(52) U.S. Cl. ..... 210/635; 210/656; 210/658; 210/198.2; 95/83; 95/88; 96/101

(58) Field of Classification Search ............... 210/635, 210/656, 658, 659, 198.2; 95/83, 88; 96/101
See application file for complete search history.

(56) References Cited

U.S. PATENT DOCUMENTS

| | | | | |
|---|---|---|---|---|
| 3,522,172 A * | 7/1970 | Hahn et al. | ..... | 210/635 |
| 3,784,467 A * | 1/1974 | Tanimura | ..... | 210/635 |
| 3,966,410 A * | 6/1976 | Jahnsen | ..... | 436/178 |
| 4,468,328 A * | 8/1984 | Kinghorn et al. | ..... | 210/634 |
| 4,479,380 A | 10/1984 | Novotny et al. | ..... | 73/61.53 |
| 4,509,964 A * | 4/1985 | Hubball et al. | ..... | 96/101 |
| 4,877,523 A * | 10/1989 | Nunogaki | ..... | 210/198.2 |
| 5,011,608 A * | 4/1991 | Damjanovic | ..... | 210/656 |
| 5,013,446 A * | 5/1991 | Li et al. | ..... | 210/635 |
| 5,354,473 A * | 10/1994 | Ito et al. | ..... | 210/635 |
| 5,422,007 A * | 6/1995 | Nicoud et al. | ..... | 210/659 |
| 5,449,461 A * | 9/1995 | Ito | ..... | 210/635 |
| 6,106,720 A * | 8/2000 | Kanel et al. | ..... | 210/634 |
| 6,503,396 B2 * | 1/2003 | Kim et al. | ..... | 210/634 |
| 6,632,353 B2 * | 10/2003 | Berger et al. | ..... | 210/198.2 |
| 6,709,595 B1 | 3/2004 | Perrut et al. | ..... | 210/634 |
| 7,667,010 B2 * | 2/2010 | Gierde et al. | ..... | 530/412 |
| 2002/0050476 A1 * | 5/2002 | Ma et al. | ..... | 210/638 |
| 2004/0104172 A1 * | 6/2004 | Weisz et al. | ..... | 210/656 |
| 2004/0173534 A1 * | 9/2004 | Margraff et al. | ..... | 210/656 |

OTHER PUBLICATIONS

Synder (Introduction to Modern Liquid Chromatography, John Wiley &Sons, New York, 1979, pp. 73-80 and 332-336.*
Akerlof, and Oshry, "The Dielectric Constant of Water at High Temperatures and in Equilibrium with its Vapor," *J. Am. Chem. Soc.*, 72:2844-2847, 1950.
Berezkin et al., "Capillary chromatographic separation of mixtures of organic compounds using steam as the mobile phase," *Russian Chemical Bulletin,*, 24:2239-2240, 1975.
Berezkina et al., "Steam chromatography with water—salt and water—acid inorganic phases," *Russian Chemical Bulletin*, 45:1642-1648, 1996.

(Continued)

*Primary Examiner* — Ernest G Therkorn
(74) *Attorney, Agent, or Firm* — Parker Highlander PLLC (57) ABSTRACT

Methods and apparatuses for chromatography are provided, using, for example, water as a stationary phase and carbon dioxide as the mobile phase.

16 Claims, 10 Drawing Sheets

OTHER PUBLICATIONS

Casas et al., "Supercritical fluid extraction of bioactive compounds from sunflower leaves with carbon dioxide and water on a pilot plant scale," *The Journal of Supercritical Fluids*, 45:37-42, 2008.

Dasgupta and Mo, "Chromatography on water-ice," *Anal. Chem.*, 69:4079-4081, 1997.

Dubbs and Gupta, "Solubility of Vitamin E (α-Tocopherol) and Vitamin K3 (Menadione) in Ethanol—Water Mixture," *J. Chem. Eng. Data*, 43:590-591, 1998.

Fogwill and Thurbide, "Capillary Separations without a conventional stationary phase," presented at $92^{nd}$ Canadian Chemistry and Exhibition, 2009.

Fogwill and Thurbide, "Carbon dioxide modified subcritical water chromatography," *Chromatogr. A.*, 1200:49-54, 2008.

Fogwill and Thurbide, "Chromatography using a water stationary phase and a carbon dioxide mobile phase," *Anal. Chem.*, 82(24):10060-10067, 2010.

Fogwill and Thurbide, "Novel capillary col. separations in subcritical water chromatography," Abstract presented for oral presentation at the $92^{nd}$ Canadian Chemistry Conference and Exhibition, 2009.

Fogwill and Thurbide, "Rapid col. heating method for subcritical water chromatography," *Chromatogr. A.*, 1139:199-205, 2007.

Yu et al., "Counter-current chromatography using supercritical fluid carbon dioxide as mobile phase," *J. Chromatography A.*, 724:91-96, 1996.

Foucault, "Countercurrent chromatography," *Anal. Chem.*, 63: 569A-579A, 1991.

Geiser et al., "Water as a stationary phase modifier in packed-col. supercritical fluid chromatography: I. Separation of free fatty acids," *J. Chromatogr. A*, 459:173-181, 1988.

Guillemin et al., "Thermal aqueous liquid chromatography—the TALC technique," *High. Resolut. Chromatogr.*, 4:280-286, 1981.

Hartkoph and Karger, "Study of the interfacial properties of water by gas chromatography," *Accounts Chem. Res.*, 6:209-216, 1970.

Hartonen and Riekkola, "Liquid chromatography at elevated temperatures with pure water as the mobile phase," *Trend. Anal. Chem.*, 27:1-14, 2008.

Ito et al., "Countercurrent chromatography: liquid-liquid partition chromatography without solid support," *Science*, 167(916): 281-283, 1970.

Karger and Hartkoph, "Rapid gas chromatographic separation of hydrocarbons over 200.degree. below their boiling points using water as liquid phase," *Anal. Chem.*, 40:215-217, 1968.

Karger et al., "Gas chromatographic study of the adsorption of insoluble vapors on water," *Colloid Interf. Sci.*, 35:328-339, 1971.

Karger, "Analytical aspects of the use of water as a stationary liquid phase in gas chromatography," *Chromatogr. Sci.*, 7:315-317, 1969.

King, "Influence of added electrolyte to the stationary phase on retention and selectivity in gas-liquid chromatography," *Anal. Chem.*, 47:1414-1417, 1975.

Lucy and Hausermann, "Co-current chromatography: A new mode of liquid-liquid chromatography," *Anal. Chim. Acta.*, 307:173-193, 1995.

Yang, "Subcritical water chromatography: A green approach to high-temperature liquid chromatography,"*Sep. Sci.*, 30:1131-1140, 2007.

Luo et al., "Chromatography with dynamically created liquid 'stationary' phases: methanol and carbon dioxide," *Anal. Chem.*, 75(14): 3557-3562, 2003.

Martin and Synge, "A new form of chromatogram employing two liquid phases: A theory of chromatography. 2. Application to the micro-determination of the higher monoamino-acids in proteins," *Biochem.* 35:1358-1368, 1941.

Miller and Hawthorne, "Subcritical water chromatography with flame ionization detection," *Anal. Chem*, 69:623-627, 1997.

Nonaka, "Gas-solid chromatography of organic compounds using steam as the carrier gas," *Anal. Chem.*, 44:271-276, 1972.

Perilloux and Deans, "Bubble col. chromatography: measurement of multicomponent vapor-liquid equilibria," *Ind. Eng. Chem. Fundam.*, 1972:138-144, 1972.

Pescar and Martin, "Solution thermodynamics from gas-liquid chromatography," *Anal. Chem.*, 38:1661-1669, 1966.

Phifer, and Plummer, "Gas chromatographic separation of polar compounds using water vapor in the carrier gas and water as the liquid phase," *Anal. Chem.* 38:1652-1656, 1966.

Purnel and Spencer, "Use of solubilizing agents in gas-phase partition chromatography," *Nature*, 175:988-989, 1955.

Sabirzyanov et al., "Solubility of water in supercritical carbon dioxide," *High. Temp.*, 40:203-206, 2002.

Sabirzyanov et al., "Water solubility of carbon dioxide under supercritical and subcritical conditions," *Theor. Found. Chem. Eng.*, 37:51-53, 2003.

Schwartz et al.,"Comparison of packed and capillary cols. for practical SFC separations," *Fresenius' Journal of Analytical Chemistry*, 330:204-206, 1988.

Shaffer and Daubert, "Gas-liquid chromatographic determination of solution properties of oxygenated compounds in water," *Anal. Chem.*, 41:1585-1589, 1969.

Smith and Burgess, "Superheated water—a clean eluent for reversed-phase high-performance liquid chromatography," *Anal. Commun.*, 33:327-329, 1996.

Smith, "Superheated water chromatography —A green technology for the future," *J. Chromatogr. A*, 1184:441-455, 2008.

Song and Parcher., "Separation of permanent gases by single-col. gas-liquid chromatography with liquid nitrogen as the stationary phase," *Anal. Chem.*, 62:2616-2619, 1990.

Wang, et al., "Chromatography with two mobile phases," *Anal. Chem.*, 78:1242-1248, 2006.

Wells et al, "Unified chromatography with $CO_2$-based binary mobile phases," *Anal. Chem.*, 75(1): 18A-24A, 2003.

Wells et al., "Gas—Liquid Chromatography with a Volatile "Stationary" Liquid Phase," *Anal. Chem*, 74:2103-2111, 2002.

Yang, "Stationary Phases for LC Separations at Elevated Temperatures," *LC-GC North Am.*, 24:S53-S58., 2006.

\* cited by examiner

APPARATUS, SYSTEM, AND METHOD FOR CHROMATOGRAPHY USING A WATER STATIONARY PHASE

The present application claims priority to U.S. Provisional Application Ser. No. 61/345,415, filed May 17, 2010, the entire contents of which is incorporated herein by reference in its entirety.

BACKGROUND

1. Field of the Invention

This invention relates to chromatographic separation and more particularly relates to an apparatus system and method for chromatography using a water stationary phase.

2. Background Information

Water offers an appealing alternative to form one or both the mobile and stationary phase of a chromatographic separation system as it is inexpensive, safe and environmentally friendly. Since the advent of column chromatography, water has been employed as the mobile phase, stationary phase, or components thereof, for various modes of analytical separations. For example, water has been used for years as a main mobile phase component in high performance liquid chromatography (HPLC), and has commonly been combined with a variety of organic solvents and inorganic buffers. Water has also been incorporated into the mobile phase in packed column (Nonaka, 1972) and capillary column (Berezkin et al., 1975) steam chromatography as well as in packed column (Geiser et al., 1988) and capillary column (Schwartz and Fresenius, 1988) supercritical fluid chromatography (SFC). In recent years however, pure water has perhaps found its niche as a mobile phase in subcritical water chromatography (SWC) which has evolved from its initial description (Guillemin et al., 1981; Smith and Burgess, 1996; Miller and Hawthorne, 1997) into a fairly widely used technique (Yang, 2007; Smith, 2008; Hartonen and Riekkola, 2008). This stems from water's advantageous qualities over organic solvents such as compatibility with flame ionization detection (FID) and thermally tuneable polarity (Akerlof and Oshry, 1950). In order to take advantage of this temperature-polarity relationship, high temperatures are required to emulate the polarities of conventional, reversed phase HPLC solvents. The maximum temperature (lowest polarity) attainable is therefore limited by the thermal stability of the stationary phase (Yang, 2006).

The incorporation of water as a stationary phase component has been explored and utilized to a much lesser extent. For example, there have been a few reports of water forming the stationary phase on solid support in the early stages of the development of gas chromatography (GC) (Purnel and Spencer, 1955; Phifer and Plummer, 1966; Karger and Hartkoph, 1968; Karger, 1969). However, water's utility as a GC stationary phase was short lived due to its very polar nature and high volatility. While these limitations precluded the use of water as an analytical stationary phase, it has also been used chromatographically in physical chemistry to quantify various solution (Pescar and Martin, 1966; Shaffer and Daubert, 1969) and interfacial (Karger et al., 1971; Hartkoph and Karger, 1970) properties of single compounds. Also of interest, aqueous solutions containing various ions have been used as GC stationary phases in order to alter analyte selectivity using conventional (King, 1975) and water-saturated (Berezkina et al., 1966) carrier gases. In addition to its utility in GC, there have also been reports of its use as a HPLC stationary phase, both coated as a liquid phase on a solid support (Martin and Synge, 1941) and as a solid, water-ice phase (Dasgupta and Mo, 1997). Alternatively, liquid water has formed a pseudo-stationary phase (or component thereof) used in the absence of solid support particles in a number of alternative separation techniques such as counter-current chromatography (CCC) (Foucault, 1991) and co-current chromatography (Lucy and Hasuermann, 1995).

Other related biphasic separation systems employing gas/liquid systems (Wells et al., 2002; Perilloux and Deans, 1972) have also been reported (Fogwill and Thurbide, 2007; Fogwill and Thurbide, 2008). In addition, systems employing supercritical $CO_2$ have been recently described. For example, supercritical fluid CCC successfully separated acetophenone and benzophenone operating at 435 rpm in 3 hours (Yu et al., 1996). More recently, methanol/supercritical $CO_2$ systems have been explored by the Parcher group employing a slowly moving methanol pseudo-stationary phase formed along the wall of an uncoated capillary (Luo et al., 2003; Wang et al., 2006). In this instance, the successful separation of light, n-alkanes was demonstrated.

SUMMARY

In one aspect of the present disclosure, there are provided methods for separating two or more compounds in a composition. These methods may include introducing a substantially stationary phase into a first end of a column, where the substantially stationary phase is aqueous. Additionally, the methods may include continuously introducing a mobile phase into the first end of the column that flows from the first end of the column to a second end of the column. The mobile phase may comprise a gas. In some embodiments, the method includes introducing a composition into the first end of the column such that at least one compound partitions between the mobile phase and the substantially stationary phase and elutes from the second end of the column. In some embodiments, the substantially stationary phase is not pooled in the column. The substantially stationary phase may form a thin film adhered to the inner surface of the column.

In some embodiments, the method may include modifying a partition coefficient between at least two of the compounds by changing a parameter of the mobile phase. That parameter may be pH, temperature, or the presence, absence, or quantity of one or more solutes. The method may include modifying a partition coefficient between at least two of the compounds by changing a parameter of the substantially stationary phase.

In some embodiments, the mobile phase is carbon dioxide, nitrogen, helium, neon, or argon. For example, the mobile phase may be carbon dioxide. In some embodiments, the mobile phase may be supercritical. The substantially stationary phase may be water, and that water may be in a subcritical state.

In some embodiments, the column may be a stainless steel tube, a silica-lined stainless steel tube, or a fused silica tube. In some embodiments, the column may not be packed. In some embodiments, some or all of the internal surface of the column is rough. For example, a roughened internal column surface may be used to achieve optimal retention of the stationary phase.

In some embodiments, the method further comprising flushing a compound out of the second end of the column with water after at least one other compound has eluted from the second end of the column in the mobile phase.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 7A-C show $C_1$-$C_5$ n-alcohol injections on different column materials at 20° C., 80 atm $CO_2$ (~200 μL/min) with 0 μL/min of water. FIG. 7A is stainless steel. FIG. 7B is fused silica. FIG. 7C is PEEK. All columns are 10 m×250 μm and peak heights are normalized for clarity. Elution order is the same as in FIG. 2.

FIGS. 10A and 10B show biofuel analysis of E10 gasoline. FIG. 10 shows temperature programmed GC analysis of a 10% E10 in $CS_2$ (v/v) sample starting at 45° C. and increasing upon injection at 10° C./min to 220° C. The dashed trace is an ethanol standard eluted under the same conditions.

FIGS. 11A and 11B show model analyte separations. FIG. 10A shows a chromatogram from an energy beverage injected neat at 20° C., 200 atm $CO_2$ (~500 μL/min) with 0 μL/min of water. Caffeine elutes at 2.8 min. FIG. 11B shows a chromatogram from tocopherol in $CS_2$ at 50° C., 80 atm $CO_2$ for 1.5 minutes followed by a 20 atm/min increase to 160 atm with 0 μL/min of water. Elution order: $CS_2$ (solvent), tocopherol.

DESCRIPTION OF ILLUSTRATIVE EMBODIMENTS

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
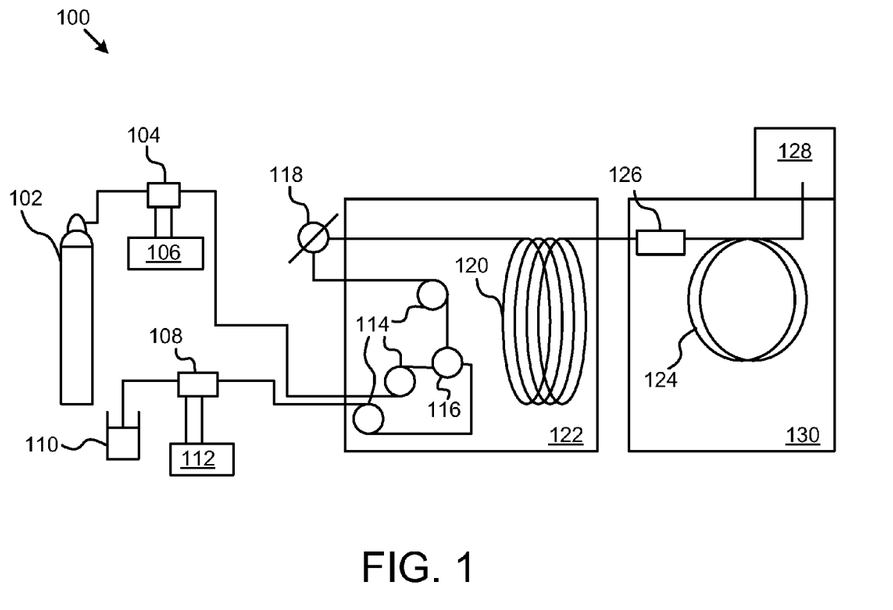
FIG. 1 shows one embodiment of a system for chromatography using a water stationary phase.

FIG. 1 illustrates one embodiment of a system 100 for chromatography using a water stationary phase. In one embodiment, the system 100 includes gas source 102 and a fluid source 110. The gas source can be a tank of $CO_2$ or other appropriate gas. The fluid source may contain pure water, or some aqueous solution. Gas pump 106 takes gas from gas source 102, passes the gas through a first water cooling jacket 104 and then pumps it into a first oven 122. The gas may be pumped through stainless steel tubes or other appropriate tubing or conduit. Water from the fluid reservoir 110 is similarly pumped into the first oven 122. The water pump 112 takes water from the fluid reservoir 110, passes it through a second water cooling jacket 108 and then pumps it into the first oven. Stainless steel tubes can be used as well as other appropriate tubes or conduit.

Once in the oven, the gas and water enter preheating coils 114. A purpose of the preheating coils is to raise the temperature of the gas and water to a temperature closer to the temperature of the first oven 122. After the gas and water have gone through the preheating coils 114, the gas and water enter a zero dead volume (ZDV) tee 116, where they are combined into one tube. After leaving the ZDV tee 116, the gas and water may enter an optional third preheating coil 114 that may further raise the temperature of the gas and water. The gas and water may then temporarily leave the first oven 122 in a tube and enter an injector 118. The injector 118 may be used to inject samples to be analyzed. For example, the sample may be bourbon whiskey, when the analyte to be measured is ethyl alcohol.

After leaving the injector, the water and gas, an perhaps sample, enter the first oven 122 where they go to the separator column 120. The separator column 120 may be a length of tubing. The tubing may be made of stainless steel, silica-lined stainless steel, or fused silica. The length may vary and can be about 10 meters long. Because separator column 120 is at least partially inside the first oven 122, it may be coiled. The water in the separator column 120 may be stationary, substantially stationary or pseudostationary, meaning that a significant amount of water will not exit the separator column 120. However, evaporation and small amounts of water leaving the separator column 120 may require water to be continuously pumped into the separator column even though the water is the stationary phase.

After leaving the first oven 122, the gas (and sample) leave the first oven and enter a second oven 130. Inside the second oven 130, the gas enters a ZDV union 126 that connects to a restrictor 124. The restrictor 124 may provide accurate control of flow volume depending on the temperature of the restrictor 124. After passing through the restrictor 124, the gas and sample leave the second oven 130 and enter a detector 128. In some embodiments the detector 128 may be a fluid ionization detector (FID).

In some embodiments a single oven may be used to achieve similar results. However, one advantage of using a second oven 130 is that one can control the temperature of the restrictor independently of the temperature of the separator column 120.

Figure 2A:
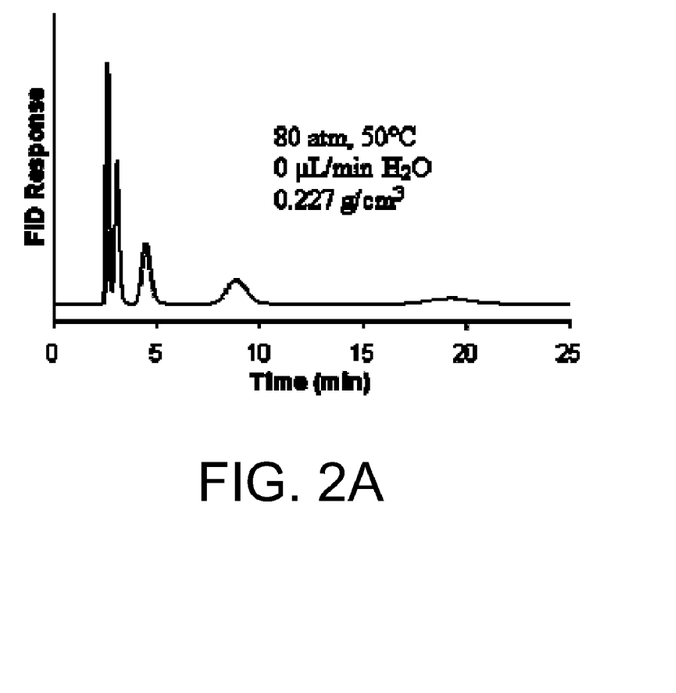
FIGS. 2A-B show separations of a model $C_1$-$C_5$ n-alcohol mixture at 50° C. with $CO_2$ pressures of 80 atm (FIG. 2A) and 120 atm (FIG. 2B) at a constant $CO_2$ flow rate of 200 μL/min. Elution order: pentanol, butanol, propanol, ethanol, methanol.
Figure 2B:
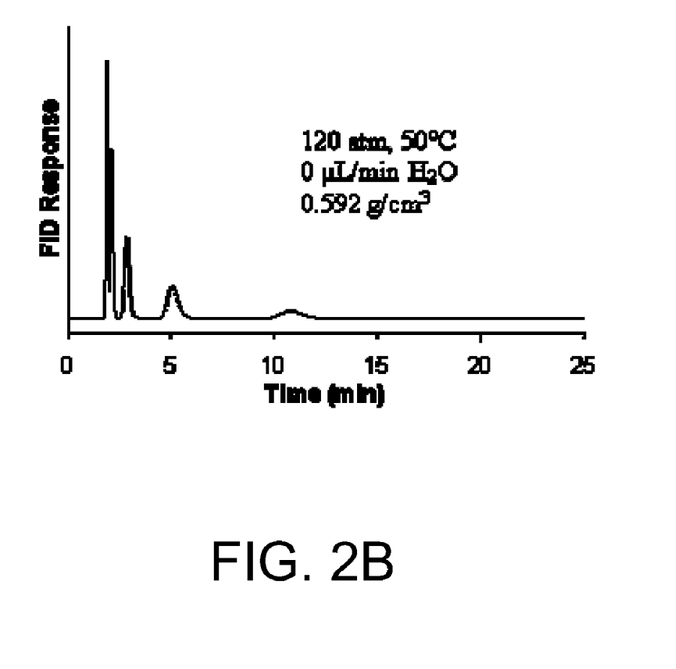

FIGS. 2A and 2B show the effect of $CO_2$ pressure on separation of a model n-alcohol mixture. As expected, an increase in pressure (density) results in a decrease in retention time. As seen in FIGS. 2A and 2B, an increase from 80 atm (0.227 g/cm$^3$) to 120 atm (0.592 g/cm$^3$) at 50° C. with a constant $CO_2$ flow rate results in the reduction of the alcohol elution time by about 45%.

Figure 3:
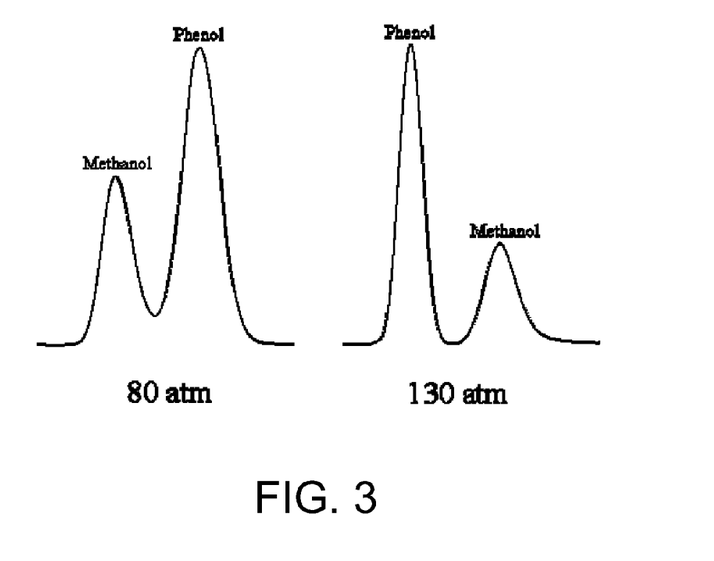
FIG. 3 shows the order of phenol and methanol elution at 80 and 130 atm $CO_2$ pressures at a constant $CO_2$ flow rate of ~200 μL/min with 1 μL/min of water at 100° C. Peak heights are normalized for clarity.
Figure 4:
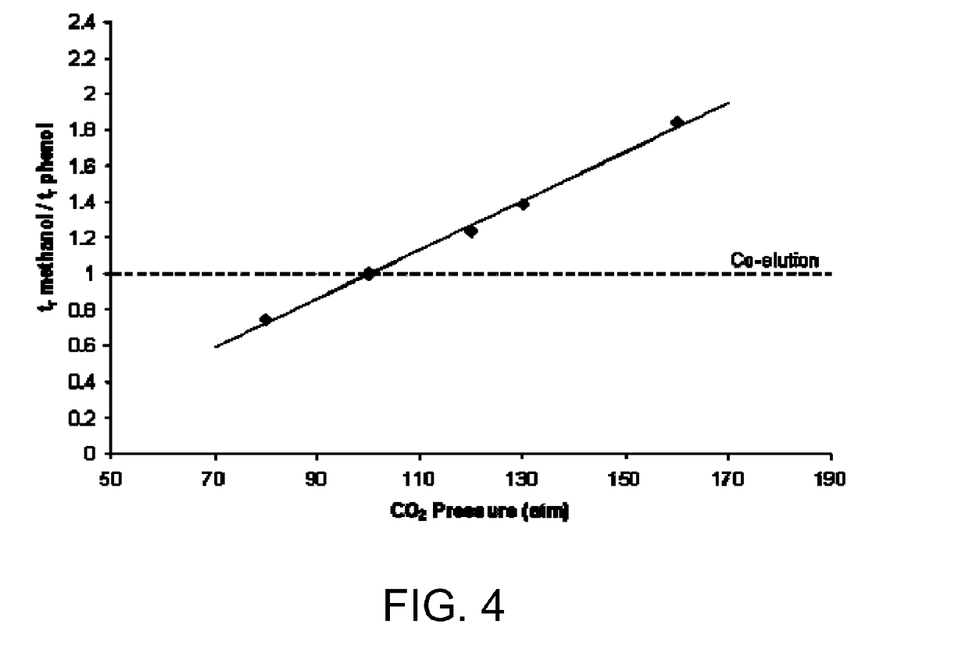
FIG. 4 shows the relationship between $CO_2$ pressure and the methanol/phenol elution order. Each run was maintained at a constant $CO_2$ flow rate of ~200 μL/min with 1 μL/min of water at 100° C.

FIG. 3 shows the effect of $CO_2$ pressure when a mixture of phenol and methanol is separated. The elution order reverses after an increase in pressure from 80 atm to 130 atm at 100° C. at a constant $CO_2$ flow rate of 200 μL/min. On the left of FIG. 3 is the elution order at 80 atm, where methanol elutes in time before phenol. On the right is the elution order at 130 atm, where the methanol elutes later in time than the phenol. This increase in solubility results in a significant reduction in the phenol retention time. Methanol's solubility in $CO_2$, conversely, does not change as dramatically as it does for phenol and therefore its change in retention time is less pronounced. The combination of a large shift in phenol retention and a smaller shift in methanol retention results in a reversal of the elution order. This peak reversal proceeds in a linear fashion over a range of pressures as seen in FIG. 4. At low pressures, the methanol peak elutes first and increasing the pressure results in co-elution at about 100 atm. Above 100 atm, the phenol peak begins to elute first and as the $CO_2$ pressure increases, the phenol peak continues to become more highly resolved from the methanol peak. Therefore, altering the $CO_2$ pressure provides for the ability to tune the partition coefficient for an analyte of interest.

Figure 5A:
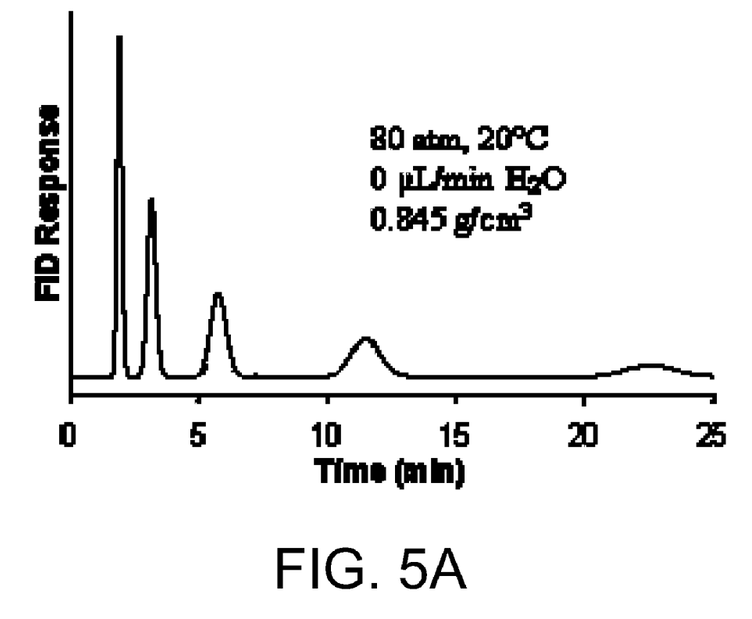
FIGS. 5A and 5B show separations of the $C_1$-$C_5$ n-alcohol mixture at temperatures of (A) 20° C. and (B) 100° C. at a constant 80 atm of $CO_2$ (200 μL/min). Elution order is the same as in FIG. 2.
Figure 5B:
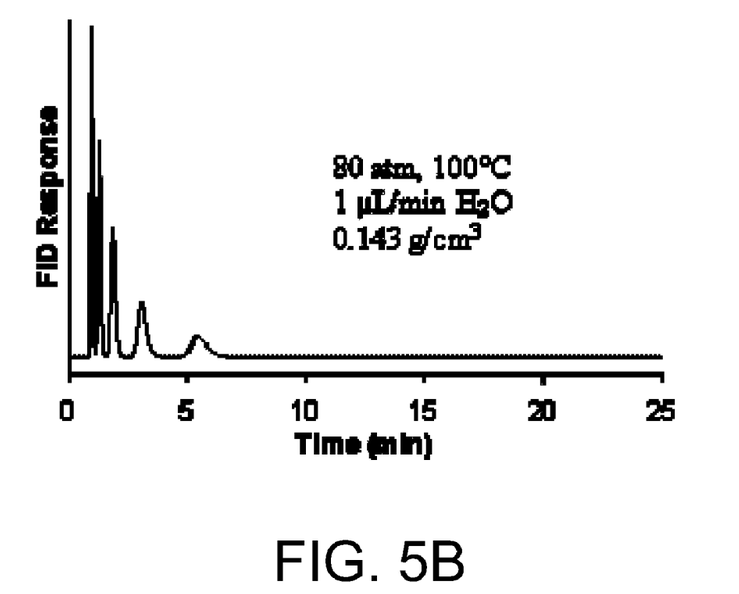

FIGS. 5A and 5B show the effect of temperature on the separation. Increasing the temperature from 20° C. to 100° C., at a constant $CO_2$ pressure of 80 atm (200 μL/min of $CO_2$), results in about a 4-fold reduction in the total elution time of an n-alcohol mixture. One reason that temperature has a profound effect on retention is that it has the potential to affect many variables in this system simultaneously such as the polarity of water, solubility of $CO_2$ in water (Sabirzyanov et al., 2003), the solubility of water in $CO_2$, (Sabirzyanov et al., 2002) the surface tension of water, the solvent strength and density of $CO_2$ and the viscosities of each fluid. Therefore, temperature, along with pressure, provides a second experimental parameter for optimizing or tuning separation.

Figure 6:
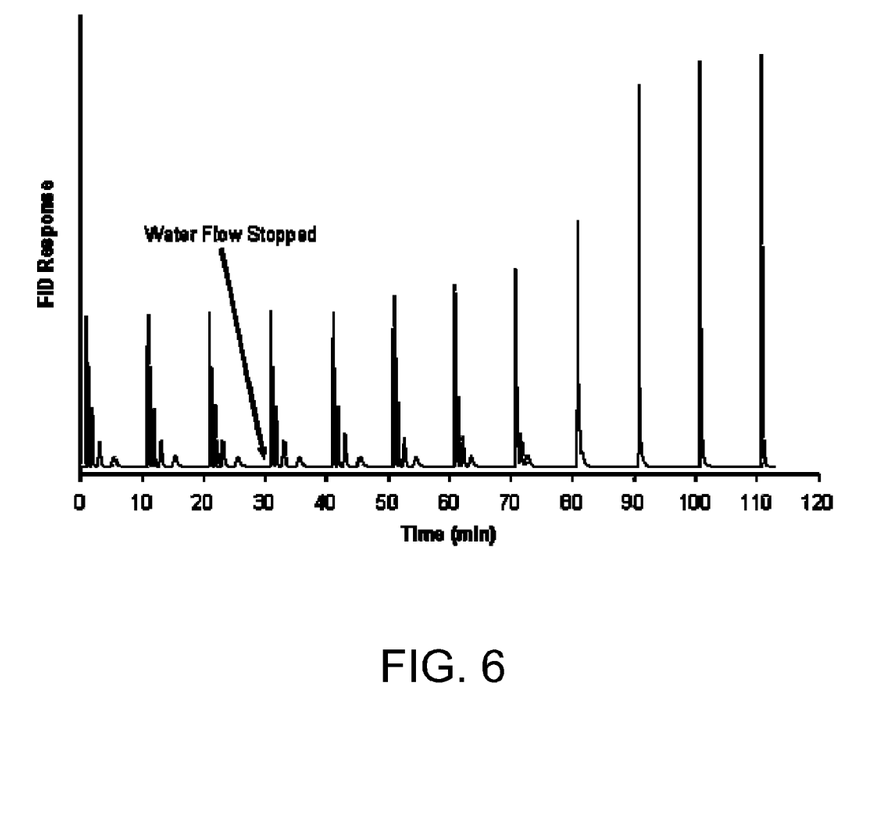
FIG. 6 shows $C_1$-$C_5$ n-alcohol injections every 10 minutes at 100° C., 80 atm $CO_2$ (~200 μL/min) with 1 μL/min of water. The water flow rate stopped at 30 minutes. Elution order is the same as in FIG. 2.

FIG. 6 shows what happens when the water flow to the separation column is interrupted. FIG. 6 shows repeated injections of the $C_1$-$C_5$ n-alcohol test mixture at 10 minute intervals. As observed, the separation is very repeatable until the water flow rate is stopped at 30 minutes. The separation then gradually degrades over time until about 110 minutes, where the water phase has depleted to the point where separation is no longer possible and all analytes co-elute with the void. This reinforces the importance of proper humidification of the column in order to maintain the stationary water phase. When the humidification is reactivated, the phase slowly re-establishes itself with about 70% of the separation capacity returning after three hours of humidification. Altering the column temperature alters the required amount of water to maintain the stationary phase. For example, at 100° C. a water flow of 1 μL/min water flow may be required, but 30 μL/min may be required at a column temperature of 250° C. At ambient temperatures, no humidification may be required and the water phase may remain intact with no notable reduction in separation efficiency. Akin to temperature, faster $CO_2$ flow rates also require greater water flow rates for proper humidification. If the $CO_2$ flow rate is dramatically increased without an increase in humidification, the water phase will slowly evaporate.

Separations in this system may be very reproducible as seen in the first few injections of FIG. 6. Although changes to the stationary phase may have a significant effect on analyte retention, once the water phase is established and maintained, it tends to be stable over long periods of time. Repeatability experiments over several hours support this with 1-propanol injections having a retention time % RSD of 1.016% (n=5) and a plate height % RSD of 7.57% (n=5). Also, the water phase establishes itself in the same way each time. After establishing the stationary phase, a separation was performed followed by an intentional collapse of the water phase. The phase was then re-established and the separation was repeated. This was performed several times and the retention time and plate height of 1-propanol were recorded. This resulted in a retention time % RSD of 3.85% (n=8) and a plate height % RSD of 7.49% (n=8).

Figure 7A:
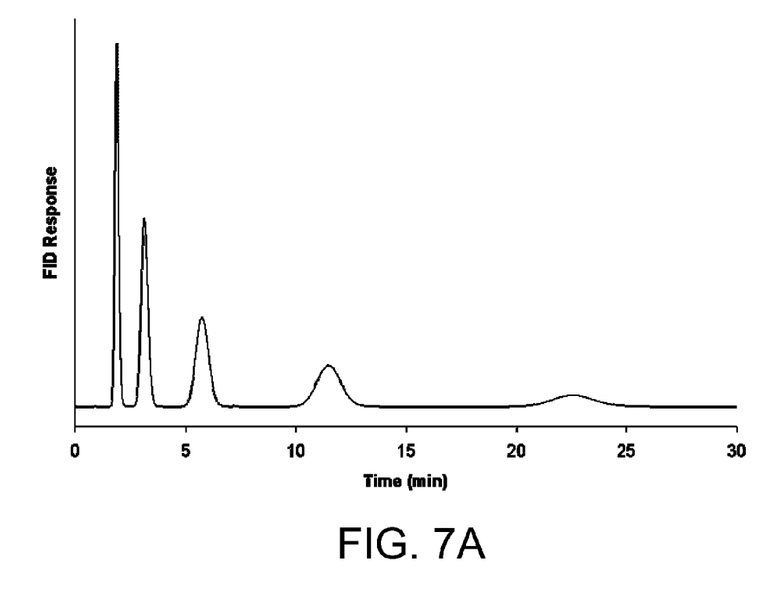
Figure 7B:
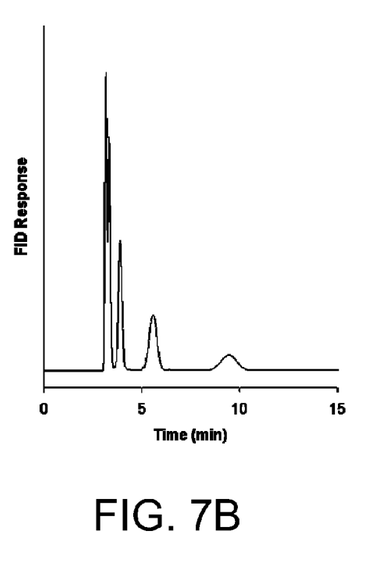
Figure 7C:
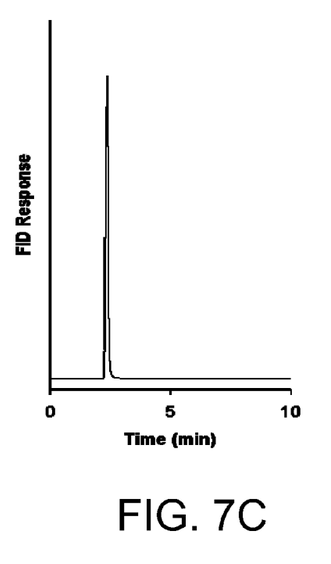

FIG. 7 shows the amount of separation that occurs with different materials, which may indicate the ability to create a water stationary phase. The stainless steel column (FIG. 7A) performs as expected. No separation is observed in the PEEK column (FIG. 7C). There was however some retention with the PEEK capillary as evidenced by the co-elution of the analytes about 1.5 minutes after the void with minor peak tailing. The fused silica column (FIG. 7B) appears to have intermediate performance when compared to PEEK and stainless steel columns. Heavier alcohols appear to be more highly retained in the fused silica capillary when compared to the stainless steel column, but in juxtaposition, methanol is less retained and elutes in about half the time on the fused silica tube. Furthermore, in comparing these two materials, resolution between n-pentanol and n-butanol is greatly reduced on the fused silica column. The differences in retention and resolution are most likely due to the ability of water to coat the inside of the column. PEEK, being the most hydrophobic, may not provide an adequate surface to form a water stationary phase. Stainless steel, on the other hand, is much more hydrophilic and may allow for a water stationary phase to form. Fused silica has an intermediate hydrophobicity which may explain its intermediate separation performance when compared to the other two column materials. Therefore, the surface of the column appears to be essential for properly retaining the water stationary phase and providing for good separations.

Figure 8:
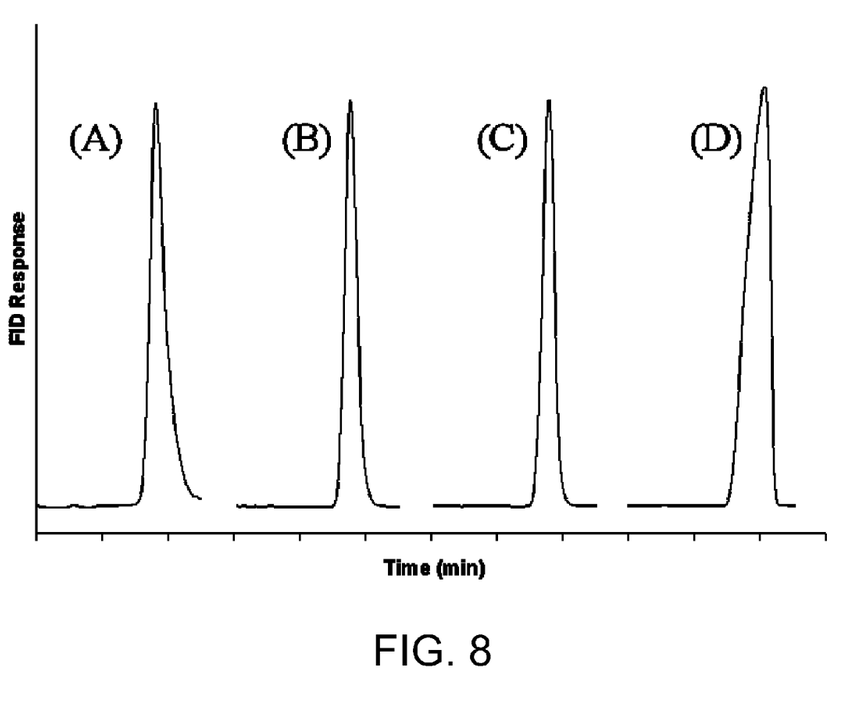
FIG. 8 shows 1-propanol injections of various masses at 100° C., 80 atm $CO_2$ (~200 μL/min) with 1 μL/min of water. (A) 0.430 μg, (B) 5.615 μg, (C) 51.150 μg, (D) 401.7 μg (pure injection). Peak heights are normalized for clarity.

Generally speaking, the amount of injected analyte can have a deleterious effect on peak shape if it overloads the stationary phase. FIG. 8 shows the peak shape when different amounts of 1-propanol solutions are introduced into the column. As seen in FIG. 8, no significant changes in peak shape are observed at about 0.5 μg (Peak A), 5 μg (Peak B) or 50 μg (Peak C) injected mass. The peak shape remains quite symmetrical until a pure injection (~500 μg (Peak D)) of analyte is introduced. This pure injection of 1-propanol shows only a small amount of peak fronting which hints that the water phase is only now beginning to become overloaded. The overall resistance to peak deformation shows that this system has a reasonably large analyte capacity and is not easily overloaded. It can also be noted that the shape of the majority of the peaks eluting from this system are very Gaussian in nature. The areas observed in FIG. 8 equate to a linear calibration curve implying favorable mass balance with no loss of analyte on the column.

Figure 9A:
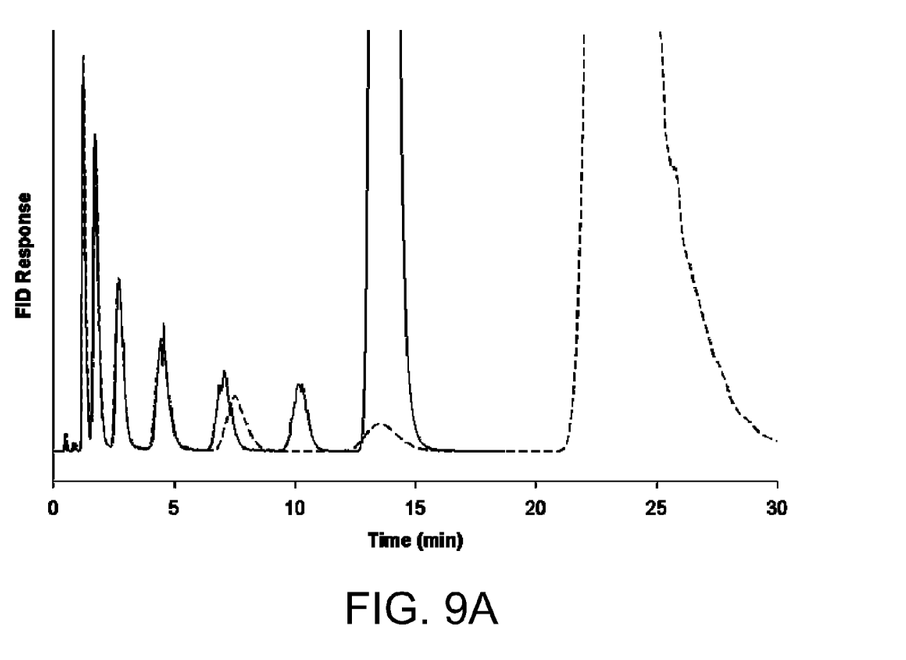
FIGS. 9A and 9B show gradient programmed separations of carboxylic acids with a water flow rate of 1 μL/min. (A) Solid trace: 80 atm $CO_2$ (200 μL/min), 100° C. for 5 min, 5° C./min to 150° C. Dashed trace: 80 atm $CO_2$ (200 μL/min), 100° C. isothermal. (B) Solid trace: 100° C., 80 atm $CO_2$ for 5 min (200 μL/min), 5 atm/min to 130 atm (350 μL/min). Dashed trace: 100° C., isobaric 80 atm $CO_2$ (200 μL/min). Elution order: octanoic acid, heptanoic acid, hexanoic acid, pentanoic acid, butanoic acid, propanoic acid, ethanoic acid (solvent).
Figure 9B:
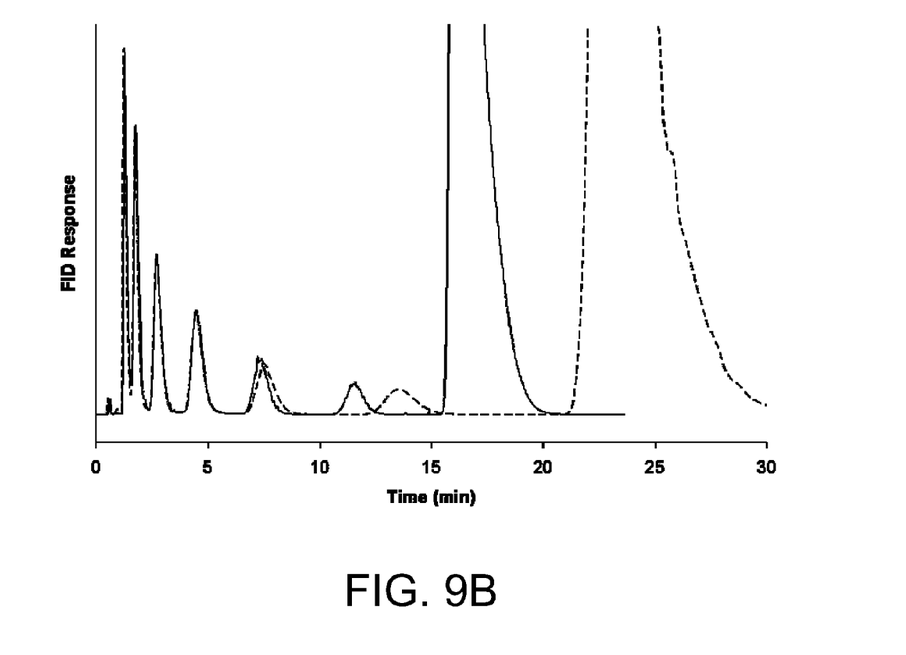

FIGS. 9A and 9B show the effect of temperature and pressure on elution time. As observed in FIG. 9A, after 5 minutes at 100° C., a mild temperature program of 5° C./min was used to a final temperature of 150° C. (solid trace). When this programmed separation is compared to an isothermal chromatogram at 100° C. (dashed trace), a decrease in total elution time by approximately 50% is observed without sacrificing resolution of the early peaks. Pressure programming also results in a decrease in separation time. As observed in FIG. 9B, a mild program of 5 atm/min to 130 atm after a 5 min initial period of 80 atm (solid trace) results in a more modest 30% reduction in total elution time when compared to an isobaric separation (dashed trace). In the case of both temperature and pressure programming there are no deleterious effects to peak shape. Therefore, both temperature and pressure programming appear to be useful techniques to increase the peak capacity of this system.

Figure 10A:
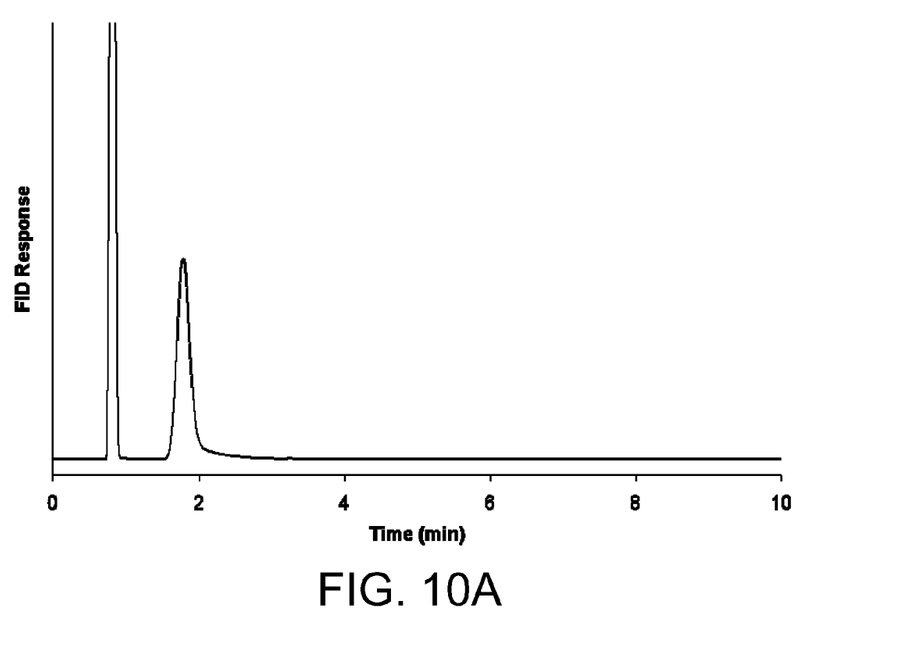
FIG. 10A shows neat E10 gasoline injected at 160° C., 80 atm $CO_2$ (~290 μL/min) with 1 μL/min of water. Elution order: gasoline components and $CS_2$ solvent (co-eluting), ethanol.
Figure 10B:
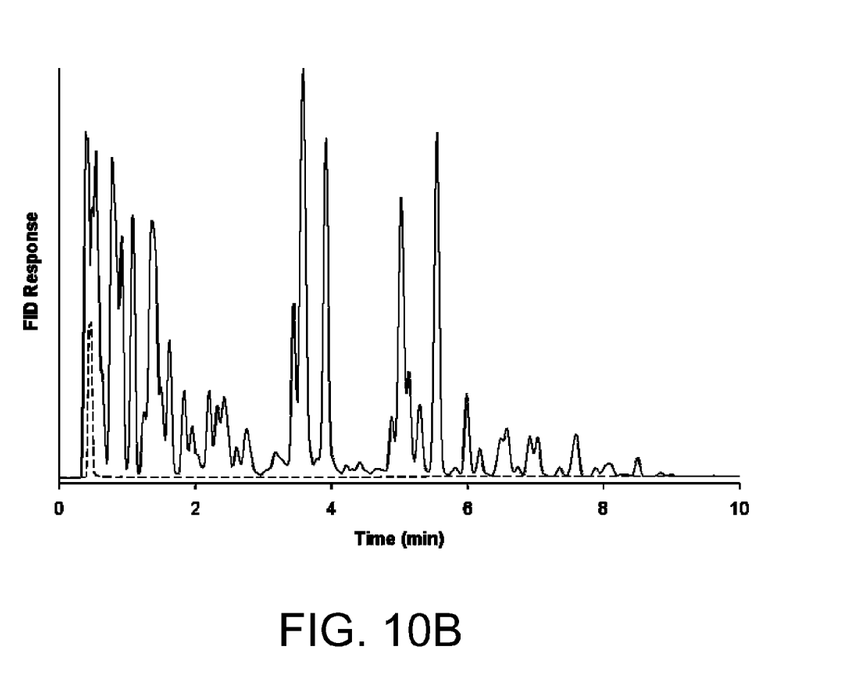

FIG. 10A shows how a system as presently disclosed can be tuned to select a single analyte, ethanol in this case, from the bulk, mostly non-polar, of gasoline components. In order to achieve this, the density of $CO_2$ is increased in order to fully dissolve the gasoline components. The ethanol retains some water solubility which results in a lone ethanol peak eluting after all of the gasoline components. Also, in order to ascertain that no other peaks are eluting under the ethanol peak, conventional gasoline (i.e. no ethanol content) may be analyzed under the same conditions and no peaks appear after the initial, large hydrocarbon response. For comparison, FIG. 10B shows a conventional, temperature-programmed GC analysis of the E10 gasoline sample. The dashed trace represents an ethanol standard, eluted under the same conditions for peak identification purposes. As observed, under these GC conditions, quantization of the ethanol peak would be very challenging and the overall analysis time is significantly longer than when the system in FIG. 10A is used. It should also be noted that due to the remarkable sample capacity and due to its bias against compounds insoluble in water, the system in FIG. 10A requires no sample preparation step for the E10 gasoline analysis. Conversely, a dilution step is required in order to not overload the conventional GC capillary column as shown in FIG. 10B.

Figure 11A:
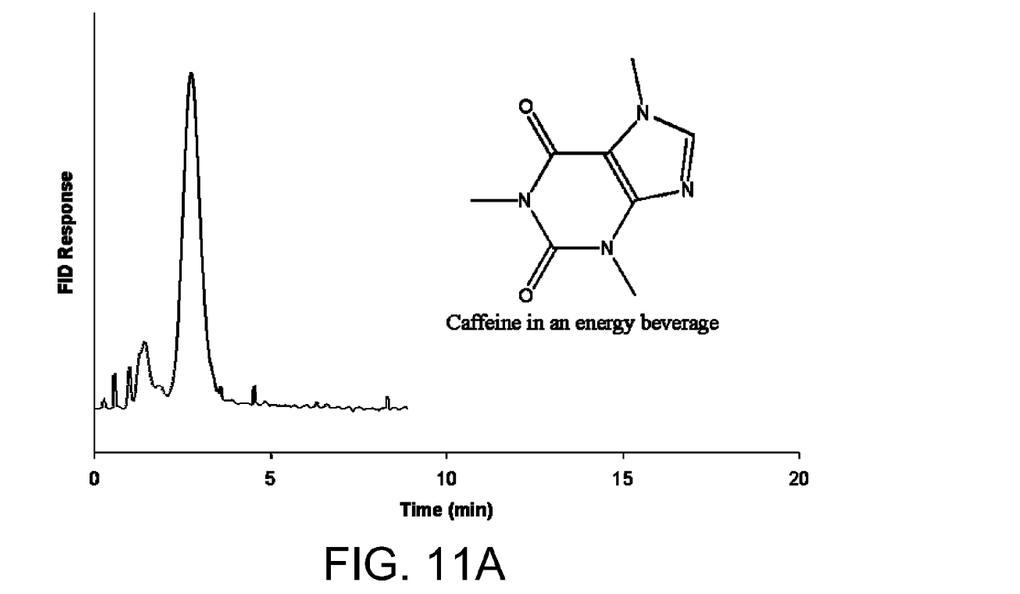

FIG. 11A shows the separation of caffeine from an energy beverage. The peak in FIG. 11A corresponds to 3.81 mg/mL of caffeine, which correlates well to the label value of 3.85 mg/mL. FIG. 11A also shows how the system can be tuned to decrease the elution of more hydrophilic components. The resultant chromatogram shows only a few peaks adjacent to the large caffeine response, making quantification quite easy. The energy beverages was injected neat, without any sample preparation steps.

Figure 11B:
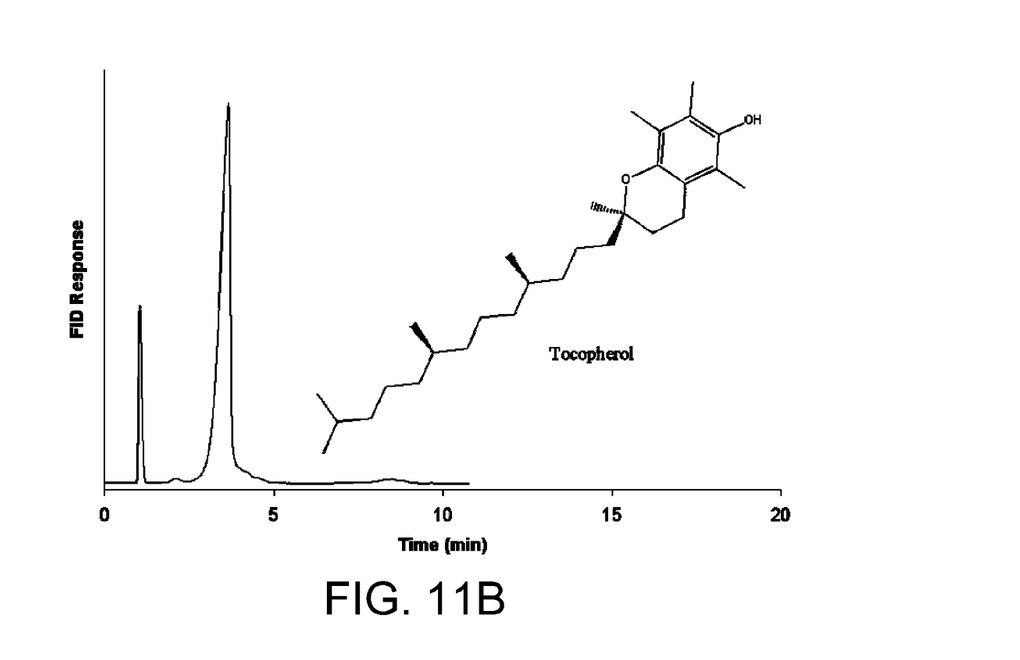

FIG. 11B shows a chromatogram resulting from the separation of an underivitized tocopherol test analyte from the solvent. This separation requires a fairly aggressive density program in order to maintain the tocopherol peak shape. The program began at 80 atm for 1.5 minutes in order to elute the $CS_2$ solvent followed by an increase of 20 atm/min to 160 atm. Under isobaric conditions, the peak appeared with a dramatic fronted profile even though it was well below a concentration that would induce asymmetry due to column overloading. This fronting effect could possibly be explained by to the limited solubility of tocopherol in water (Dubbs and Gupta, 1998). The increased $CO_2$ density provided by the programmed separation is required to elute tocopherol band with minimal peak fronting. The system provides an alternative separation method which provides quick throughput times and excellent FID response due to the large carbon content of the tocopherol molecule.

In some embodiments, there are provided chromatographic separation devices and methods, which employ water as a stationary phase and $CO_2$ as a mobile phase. Because water and $CO_2$ have little miscibility, conditions can be attained that create a stationary phase of water lining the inside of an uncoated stainless steel capillary. Altering temperature and pressure may be used to can change both the density of the $CO_2$ mobile phase and the polarity of the water stationary phase. These and other process parameters may be optimized, allowing for different gradient programmed separation options. In some embodiments, the methods are free from organic stationary and mobile phase components, which may make them environmentally compatible and/or allow the use of universal flame ionization detection. In some embodiments, the devices and methods disclosed herein may offer favorable sample capacity, peak symmetry, and retention time reproducibility (~1% RSD run-to-run, ~4% RSD day-to-day). In some embodiments, the devices and methods disclosed herein may be applied to the quantification of ethanol in alcoholic beverages and biofuels, and to the caffeine levels in drinks. In some embodiments, the devices and methods disclosed herein provide quick throughput times and/or little or no need for sample preparation.

For any components of the composition that may stay in the stationary phase and do not elute using $CO_2$, after initial $CO_2$ separation, one may then, in some embodiments, fill the column with water and flush those components out, for example, into the detector.

In some embodiments, the methods disclosed herein may be used to detect and/or analyze phenols in wastewater.

In some embodiments, additives may be incorporated into the water phase (e.g. chiral additives). Such modified stationary phases may be used, for example, in a larger prep scale fashion to produce pure compounds, e.g., larger amounts of pure chiral compounds in pharmaceutical applications.

In some embodiments, the methods disclosed herein may be used to decaffeinate coffee. Given the selectivity with which it was possible to isolate a caffeine peak in analytical scale, the methods disclosed herein may also be used, in some embodiments, to extract and/or decaffeinate coffee on a larger scale.

In some embodiments, the surface roughness of the column may play a role in the retention of water or other stationary phase on the surface of the capillary wall. Thus, the rougher the surface, the better water may be spread and/or retained, which could lead to improved efficiency. Any rough surface is likely then to be a good candidate to retain water, beyond just stainless steel. For example, other rough and/or porous material where water could be held in surface divots may be used.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

Examples

The following is an example of a system for chromatography using a water stationary phase. It is presented by way of example, not limitation. The references designators refer to FIG. 1.

Water, from the fluid reservoir 110 and $CO_2$ from the gas source 102 are introduced into the system by twin Isco 260D syringe pumps (Teledyne Isco Inc., Lincoln, Nebr., USA). The gas pump 106 is operated in constant pressure mode and the $CO_2$ flow rate varied accordingly with the set system pressure. The gas pump 106 is equipped with a water cooling jacket 104 operated at about 10° C. to ensure greater filling efficiency and reliable fluid metering. The fluid pump 112 is operated in constant flow mode where the flow rate is optimized as necessary to maintain the water stationary phase at different temperatures. The water pumped by fluid pump 112 flows through a second water cooling jacket 108. Each pump outlet is connected to an individual 2.8 m length of coiled stainless steel tubing (1/16 in. O.D.×0.010 in. I.D.; Chromatographic Specialties, Brockville, ON, Canada) that led through a Shimadzu model GC-8A gas chromatograph (Shimadzu, Kyoto, Japan) convection oven 112 wall. The convection oven 112 pre-heats the water and $CO_2$ as they pass through preheating coils 114. The respective pump lines are joined inside the oven in a 1/16 in. Valco zero dead volume stainless steel tee union 116 (from Chromatographic Specialties). An additional preheating coil 114 made of a coiled 1 m length of tubing led from the tee allows for further pre-heating before briefly exiting the GC oven and connecting to an injector 118, which is a Rheodyne model 7520 injector (Alltech, Deerfield, Ill., USA) equipped with a 0.5 µL sample loop. The separation column 120 is a 250 µm I.D. 10 m length of the same tubing and is connected to the outlet of the injector 118, led through the GC oven wall, and is coiled inside. A short length of the end of the column exits the separation oven 122 and led into a second Shimadzu model GC-8A gas chromatograph (Shimadzu) convection oven 130 which provides convenient, independent heating of the restrictor and the FID system. However, single oven heating may also provide for good separations. Inside the second oven 130, the end of the column connects to a zero dead volume (ZDV) union 126, which then connects to a restrictor 124. Restrictor 124 provides flow restriction and is made from a 60 cm length of 50 µm I.D. fused silica tubing (Polymicro Technologies, Phoenix, Ariz., USA) heated to an optimized 180° C. The restrictor 124 length and temperature can be altered to provide some control over $CO_2$ flow rate. The end of the restrictor is placed inside an FID 128 jet about 1 cm from the tip where it provides the best performance in terms of flame stability and response. The FID 128 gas flow rates are typically about 350 mL/min of medical-grade air (Praxair, Calgary, AB, Canada) and about 50 mL/min of hydrogen (Praxair). The latter is occasionally increased as needed to maintain flame stability at different column flow rates. The detector block is held at 350° C. It should be noted that no corrosion has been evident in the 250 µm stainless steel capillary even after using the same 10 m length of tubing throughout numerous separations.

In this example, instrument-grade $CO_2$ (99.99%; Praxair) and nitrogen-purged, HPLC-grade water (Sigma-Aldrich, Oakville, ON, Canada) are used. Analyte standards are prepared by dissolving test compounds (all≧99%; Sigma-Aldrich) in HPLC-grade solvents (Sigma-Aldrich). All analyte solutions are prepared to approximately 10 mg/mL except for the citric acid solution which is prepared to 20 mg/mL. All solutions are prepared in water except for the alkane and tocopherol solutions which are prepared in carbon disulfide as well as the carboxylic acid solution which is prepared in acetic acid.

Before separations are possible, the water stationary phase must be established inside the column. There are at least two ways of establishing the stationary phase. Using the first way, the water pump 112 is first operated in pressure mode (set to the same pressure as the $CO_2$ pump) in order to rapidly fill the separator column 120. After the column 120 has been completely filled with water, the flow rate on the water pump 112 reduces considerably. At this point, the $CO_2$ pump 106 is opened to the system, operating in pressure mode, set to the desired pressure. Next, the water pump 112 is returned to flow mode and set to the optimized water flow rate. Finally, the system 100 is allowed to equilibrate until the FID 128 flame stabilizes and separations are able to be performed.

Using the second way to establish the stationary phase, the procedure begins with heating the ovens while setting the $CO_2$ pump 106 pressure. $CO_2$ is allowed to flow through the heated system until the flow rate has stabilized. Next, the water stationary phase is established by introducing a higher than optimum water flow rate which is calculated from the $CO_2$ flow rate. This high flow rate of water is maintained until there is audible and visual evidence of water exiting the FID 128 nozzle. At this point it can be reasonably assumed that water has coated the entirety of the column and the water flow rate can now be lowered to the optimized, operating level. The system is then allowed to equilibrate until the FID 128 flame stabilizes and separations are able to be performed.

Once the stationary phase has been established, flow rates ranging from 120 to 400 µL/min result in little change in the plate height for a methanol test analyte. Therefore, the system does not appear to be mass transfer limited within these typical operating flow rates. However, as expected, retention time changes more dramatically when altering flow rate. For example, increasing the flow rate from 120 to 400 µL/min at 40 µL/min intervals results in a linear decrease in methanol retention time from about 30 min to 5.5 min. Flows above about 450 µL/min result in a gradual collapse of the separation capability likely due to evaporation of the stationary phase. It is likely, however, that increasing the water flow rate would allow for faster $CO_2$ flow rates (vide infra).

Referring to the restrictor, fused silica tubing is selected due to its availability in small I.D. However, due to silica's erosion in hot water, these restrictors have limited lifetimes and require frequent replacement to ensure flow rate reproducibility. Stainless steel restrictors may be a better choice in some applications. Maintaining the restrictor temperature independently of the column oven is advantageous due to the ability to allow for independent control of restrictor and column temperatures, to allow for stabilization of detector response and also to allow for slight control over flow rate without physically changing the restrictor length. Restrictor temperatures below 180° C. may result in FID flame flicker noise with occasional FID flame outages. Conversely, increasing the restrictor temperature above 180° C. may result in a modest, linear, decrease in $CO_2$ flow rate. For example, increasing from 180° C. to 300° C. nets about a 15% reduction in flow rate.

Changes in column length have a fairly linear effect on efficiency and retention. For example, a reduction in column length from 10 m to 5 m results in about half the efficiency and about half the retention time. Decreasing the column I.D. results in a linear reduction in methanol elution time relative to the resultant increase in linear velocity. For example, the methanol elution time decreases in a linear fashion at constant flow rate with a reduction in column I.D., from about 20 minutes at 1 mm to approximately 4.5 minutes in the 0.125 mm I.D. column. In each of these cases, the plate height of a methanol test analyte remains relatively consistent. The resolution between n-propanol and n-butanol peaks remain relatively constant over a range of column dimensions with a slight reduction in the measured value in the 0.125 mm I.D. column.

In order to estimate the volume and thickness of the water phase, the water phase may be collected and its mass measured. After establishing the water phase as normal, the water flow to the column is stopped and the column effluent is simultaneously collected in a vessel packed in dry ice. The column is then purged with pure, dry $CO_2$ (100° C., 80 atm) for two hours in order to collect the contents of the column. The mass of water collected is determined and then converted to volume. The resultant water phase volume is $33.2 \pm 1.0$ µL (n=3). Assuming a continuous, uniform water phase coating the inner surface area of the column, this translates into a water phase with a thickness of $4.31 \pm 0.13$ µm.

In this example, experiments were first performed to determine if any of the separation was due to analyte interaction with the surface of the stainless steel capillary. The alcohol test mixture was injected into the stainless steel capillary with only pure $CO_2$ entering the column (no water) at 100° C. and 80 atm with a flow rate of about 400 µL/min. No separation occurred and all compounds co-eluted as one peak at approximately 13 minutes. Conversely, with only water flowing through the stainless steel capillary (no $CO_2$) at 200 µL/min and 100° C., no separation of the alcohol mixture occurred with all peaks eluting at approximately 40 minutes. From these experiments, it appears that there is no analyte retention caused by interaction with the stainless steel surface and therefore, both $CO_2$ and water must be present in order to separate compounds in this system.

Next, in order to determine the effect that the analyte character has on the separation, two compounds were injected, one with limited water solubility and high $CO_2$ solubility and a second with high water solubility and limited $CO_2$ solubility. This experiment was performed in order to better understand the mobile and stationary phase interactions. Each analyte solution was injected under the same conditions of 80 atm, 100° C. with 1 µL/min of water flow and about 200 µL/min of $CO_2$ flow. A mixture of n-alkanes in carbon disulfide was selected as an example of compounds with high $CO_2$ solubility and limited water solubility. Upon injection to the system, no separation was observed and all compounds eluted with the void at approximately 30 seconds. Citric acid was next selected as a compound with full water solubility and limited solubility in $CO_2$. When this compound was injected into the system no elution was detected after many hours of operation. This experiment was repeated with a 1 m column with the same conditions and again, no elution was observed after many hours of operation. This evidence seems to suggest that the water phase is not moving inside the column. Conversely, if the water phase was moving along the inside of the wall a rise in baseline would be expected after the portion of the water phase eluted which contained the citric acid injection. No perturbation in the baseline was observed over many hours of operation which supports the postulate that the water phase is stationary.

From these investigations into the separation mechanism, two conclusions can be derived. Primarily, it appears that a compound has to have some solubility in both water and $CO_2$ in order to be separated in this system. Secondly, from the citric acid experiment, it can be assumed that the water phase is effectively stationary for a realistic chromatographic timeframe and the low flow rates of water are only required to humidify the mobile phase and prevent the stationary phase from evaporating.

In this example, the separation system was first applied in order to quantify the amount of ethanol in alcoholic beverages. A 1-propanol internal standard was employed and the alcohol content was determined to be 39.3% in a commercial sample of 80-proof bourbon whiskey and 12.7% in a sample of home-made wine.

In following the ethanol trend, the system was applied to quantitatively evaluate the ethanol content in gasoline with an advertised content of 'up to 10% ethanol by volume' (E10 biofuel). In this case, an external calibration curve was employed and we were able to determine the ethanol content to be 9.03% v/v.

The system was also applied to the analysis of caffeine levels in beverages. In this case, the conditions were toggled so that the majority of water-soluble components would partition into the water phase allowing for only those compounds with higher $CO_2$ solubility to elute in a timely fashion. A cup of coffee from a popular chain of Canadian donut stores was analysed with an external calibrant and found to contain 0.392 mg/mL of caffeine which agrees well with the published value of 0.333 mg/mL.

REFERENCES

The following references, to the extent that they provide exemplary procedural or other details supplementary to those set forth herein, are specifically incorporated herein by reference.

Akerlof, and Oshry, *Am. Chem. Soc.*, 72:2844-2847, 1950.
Berezkin et al., *Chem. B+,* 24:2239-2240, 1975.
Berezkina et al., *Chem. B+,* 45:1642-1648, 1996.
Dasgupta and Mo, *Anal. Chem.*, 69:4097-4081, 1997.
Dubbs and Gupta, *J. Chem. Eng. Data,* 43:590-591, 1998.
Fogwill and Thurbide, *Chromatogr. A.,* 1139:199-205, 2007.
Fogwill and Thurbide, *Chromatogr. A.,* 1200:49-54, 2008.
Foucault, *Anal. Chem.,* 63:569A-579A, 1991.
Geiser et al., *J. Chromatogr. A,* 459:173-181, 1988.

Guillemin et al., *High. Resolut. Chromatogr.*, 4:280-286, 1981.
Hartkoph and Karger, *Accounts Chem. Res.*, 6:209-216, 1970.
Hartonen and Riekkola, *Trend. Anal. Chem.*, 27:1-14, 2008.
Karger and Hartkoph, *Anal. Chem.*, 40:215-217, 1968.
Karger et al., *Colloid Interf. Sci.*, 35:328-339, 1971.
Karger, *Chromatogr. Sci.*, 7:315-317, 1969.
King, *Anal. Chem.*, 47:1414-1417, 1975.
Lucy and Hausermann, *Anal. Chim. Acta*, 307:173-193, 1995.
Luo et al., *Anal. Chem.*, 75:3557-3562, 2003.
Martin and Synge, *Biochem. J.*, 35:1358-1368, 1941.
Miller and Hawthorne, *Anal. Chem.*, 69:623-627, 1997.
Nonaka, *Anal. Chem.*, 44:271-276, 1972.
Perilloux and Deans, *Ind. Eng. Chem. Fundam.*, 1972:138-144, 1972.
Pescar and Martin, *Anal. Chem.*, 38:1661-1669, 1966.
Phifer, and Plummer, *Am. Chem.* 38:1652-1656, 1966.
Purnel and Spencer, *Nature*, 175:988-989, 1955.
Sabirzyanov et al., *High. Temp.*, 40:203-206, 2002.
Sabirzyanov et al., *Theor. Found. Chem. Eng.*, 37:54-57, 2003.
Schwartz and Fresenius, *Anal. Chem.*, 330:204-206, 1988.
Shaffer and Daubert, *Anal. Chem.*, 41:1585-1589, 1969.
Smith and Burgess, *Anal. Commun.*, 33:237-329, 1996.
Smith, *J. Chromatogr. A*, 1184:441-455, 2008.
Wang, et al., *Anal. Chem.*, 78:1242-1248, 2006.
Wells et al., *Anal. Chem.*, 74:2103-2111, 2002.
Yang, *North Am.*, 24:S53-S58., 2006.
Yang, *Sep. Sci.*, 30:1131-1140, 2007.
Yu et al., *Chromatogr. A.*, 724:91-96, 1996.

What is claimed is:

1. A method for separating two or more compounds in a composition, the method comprising the steps of:
   (a) introducing a substantially stationary phase into a first end of a column, where the substantially stationary phase is aqueous, and such that (i) the aqueous stationary phase establishes a uniform coating on the inside walls of the column, and (ii) the aqueous stationary phase does not pool in the column;
   (b) continuously introducing a mobile phase into the first end of the column, where the mobile phase flows from the first end of the column to a second end of the column; and
   (c) introducing a composition comprising two or more compounds into the first end of the column such that at least one compound partitions between the mobile phase and the substantially stationary phase and elutes from the second end of the column, wherein the at least one compound is soluble in both the stationary phase and the mobile phase.

2. The method of claim 1, wherein the method comprises modifying a partition coefficient between at least two of the compounds by changing a parameter of the mobile phase.

3. The method of claims 2, wherein the parameter is pH, temperature, or the presence, absence, or quantity of one or more solutes.

4. The method of claim 1, wherein the method comprises modifying a partition coefficient between at least two of the compounds by changing a parameter of the substantially stationary phase.

5. The method of claim 4, wherein the parameter is pH, temperature, or the presence, absence, or quantity of one or more solutes.

6. The method of claim 1, where the mobile phase is carbon dioxide, helium, neon, nitrogen, or argon.

7. The method of claim 6, wherein the mobile phase is carbon dioxide.

8. The method of claim 6, wherein the mobile phase is supercritical.

9. The method of claim 6, wherein the mobile phase is a liquid.

10. The method of claim 6, wherein the mobile phase is a gas.

11. The method of claim 1, where the substantially stationary phase is water.

12. The method of claim 11, where the water is subcritical water.

13. The method of claim 1, where the column is a stainless steel tube, a silica-lined stainless steel tube, or a fused silica tube.

14. The method of claim 1, where the column is not packed.

15. The method of claim 1, wherein some or all of the internal surface of the column is rough.

16. The method of claim 1, further comprising flushing a compound out of the column with water after at least one other compound has eluted from the column in the mobile phase.

* * * * *